H. M. CROUSE AND G. G. NEWELL.
COMBINED AUTOGRAPHIC REGISTER AND RECORDING MACHINE.
APPLICATION FILED JUNE 24, 1918.

1,355,816.

Patented Oct. 19, 1920.
5 SHEETS—SHEET 1.

Fig. 1.

Inventors.
Henry M. Crouse
and George G. Newell,
By Luther W. Hawley
Atty.

Inventors
Henry M. Crouse
and George G. Newell,
By Luther W. Hawley
Atty.

UNITED STATES PATENT OFFICE.

HENRY M. CROUSE, OF CHICAGO, AND GEORGE G. NEWELL, OF CONGRESS PARK, ILLINOIS.

COMBINED AUTOGRAPHIC REGISTER AND RECORDING-MACHINE.

1,355,816.　　　　Specification of Letters Patent.　　Patented Oct. 19, 1920.

Application filed June 24, 1918. Serial No. 241,629.

*To all whom it may concern:*

Be it known that we, HENRY M. CROUSE and GEORGE G. NEWELL, citizens of the United States, and residents, respectively, of Chicago, in the county of Cook and State of Illinois, and of Congress Park, in the county of Cook and State of Illinois, have invented certain new and useful Improvements in Combined Autographic Registers and Recording-Machines, of which the following is a full, clear, and exact specification.

This invention relates to combined autographic registers and recording machines.

The primary object of the invention is to couple and interlock the two machines together in such a manner that neither machine can be operated without operating the other, and that the machines cannot be operated unless all of the necessary and essential parts thereof are in perfect adjustment thereby insuring accurate records in both machines.

Further and more specific objects are:

First, to necessitate operation of the recorder before the autographic register can be operated to deliver the record strip;

Second, to necessitate the making of a record in the recording machine upon the operation of the autographic register to deliver the record strip;

Third, to necessitate the proper adjustment of the autographic register paper feeding mechanism before said mechanism can be operated to deliver a record strip;

Fourth, to prevent the recording of any data in the recording machine when the feeding mechanism of the autographic register is out of adjustment;

Fifth, to automatically clear the recording machine and return the recording mechanism to its normal or zero position as the paper feeding mechanism of the autographic register is placed in correct adjustment;

Sixth, to automatically throw out of operation the auxiliary parts of the autographic register such as the printing mechanism and the supplementary feed therefor, as the paper feeding mechanism is thrown out of proper adjustment.

One embodiment of the mechanism by which we attain the above objects is illustrated in the accompanying drawings, and is described and claimed in the following specification, and in these drawings,—

In the following specification the various parts of the machine will be described in the following order: first, the construction of the autographic register; second, the construction of the recording machine; and third, the construction of the interlocking elements which are employed to carry out the objects of the invention above set forth.

Turning first, then, to the construction of the autographic register, and referring particularly to Figs. 1 to 6 inclusive, it will be seen that the register employed is provided with a casing made up of two sections, a front section 20 and a rear section 21. The front section houses the paper supply reels 21' which are supported as shown, one above the other. The paper after leaving the supply rollers passes between suitable type rollers 22 and compression rollers 23, the latter being pressed toward the type rollers by means of springs 24. The type rollers 22 contact with inking rollers 25 disposed below the same and print upon the record strips the desired data for receiving the record in the register. The paper strips after passing through the printing mechanism are lead around an idler 26 and across the platen 27 suitably supported between the side walls of the casing 21, and from the platen the strips pass between the paper feeding rollers 28. These rollers are actuated from a shaft 29 by means of a gear 30 which meshes with a gear 31 carried by the lower feed roller at one end thereof. At its opposite end the lower roller carries a gear 31' which meshes with a corresponding gear 32 carried by the upper feed roller. A gravity pawl 33 is provided to prevent the reverse rotation of the driving gear 30. We prefer to construct the driving mechanism in such a manner that the throw of the handle 34 carried by the shaft 29 through 180° will feed one strip of paper.

The construction above described is fully shown and described in Patent No. 1,254,988, issued Jan. 29, 1918, and for this reason a more complete showing of this construction is believed to be unnecessary in this application.

Figures 3, 5:
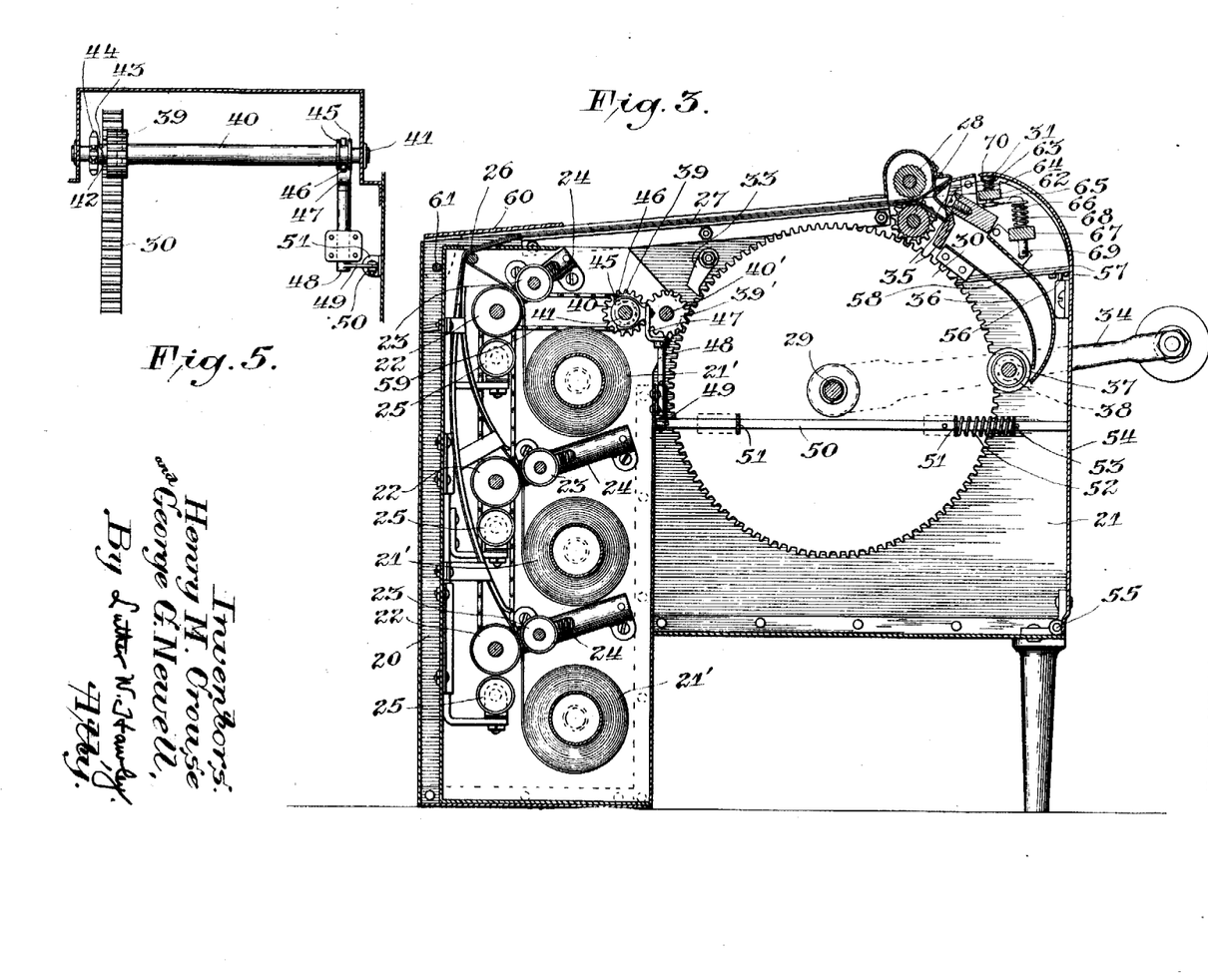
Fig. 3 is a vertical section of the autographic register.
Fig. 5 is a detail view partly in section showing the clutch mechanism for the auxiliary paper feeding means used in connection with the printing rollers.

Suitable knives 35 are provided in rear of the feeding rollers for the purpose of severing the records retained in the machine, these records passing downwardly through a chute 36 and being fed into the bottom of the casing by means of a roller 37 which is provided with a gear 38 meshing with the gear 30 carried by the feed shaft 29.

The type rollers 22 are positively rotated, and driving connections between these rollers and the driving gear 30 are provided, these connections including means for disconnecting the type rollers from their operating mechanism when the feeding rollers of the register are thrown out of proper feeding adjustment.

Referring now to Figs. 3 and 5, a gear 39 is carried by a sleeve 40 slidably mounted on a stub shaft 41 suitably supported between the walls of the autographic register, and this gear 39 meshes with an idler gear 39' carried by a suitably supported shaft 40' which in turn engages the driving gear 30 carried by the shaft 29. The sleeve 40 adjacent the gear 39 is provided with clutch teeth 42 adapted to mesh with corresponding clutch teeth 43 formed integral with or suitably secured to a sprocket wheel 44, also carried by the shaft 41. The sleeve 40 is provided near one end with fixed spaced apart collars 45 between which is carried a bifurcated clutch shipping fork 46 secured to an angular bracket 47. The bracket 47 is carried at the upper end of a spindle 48 which is provided at its lower end with a laterally projecting arm 49 pivotally connected with a slide bar 50 slidably carried by brackets 51 secured to one side wall of the autographic register. The slide bar 50 is normally spring pressed in a rearward direction by means of a spring 52 which contacts at one end with a pin 53 carried by the slide bar 50, and at the opposite end with one of the brackets 51 carried by the side wall of the register. The rear wall 54 of the autographic register is hinged at 55 to the bottom wall of the rear casing 21, the rear wall 54 being provided with suitable locking means 56 which coöperates with members 57 carried by a bridge plate 58 connected with the side walls of the register, whereby the rear hinged wall 54 may be locked in closed position.

From the above description it will be seen that as the rear wall is swung rearwardly and downwardly the spring 52 will force the slide bar 50 rearwardly, actuating the clutch shipping fork 46 to throw the clutch members 42 and 43 out of mesh with each other, thereby disconnecting the sprocket wheel 44 from the driving gear 39. The sprocket wheel 44 is connected by a chain 59 to corresponding sprocket wheels carried by the remaining type rolls, these rolls being driven simultaneously.

Figure 6:
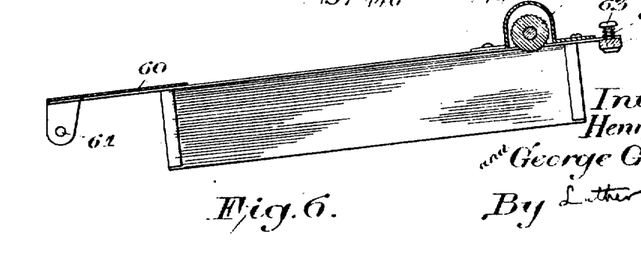
Fig. 6 is a detail view of the cover plate of the autographic register.

As illustrated in Fig. 6, the upper feed roller is carried by the cover plate 60 hinged at 61 to the side walls of the register. This cover plate is provided at its rear end with a transverse bar 62 in which is slidably mounted a series of pins 63 which are pressed upwardly by means of springs 64 mounted between the heads of the pins and the bar 62.

Figures 4, 8, 13, 14, 15:
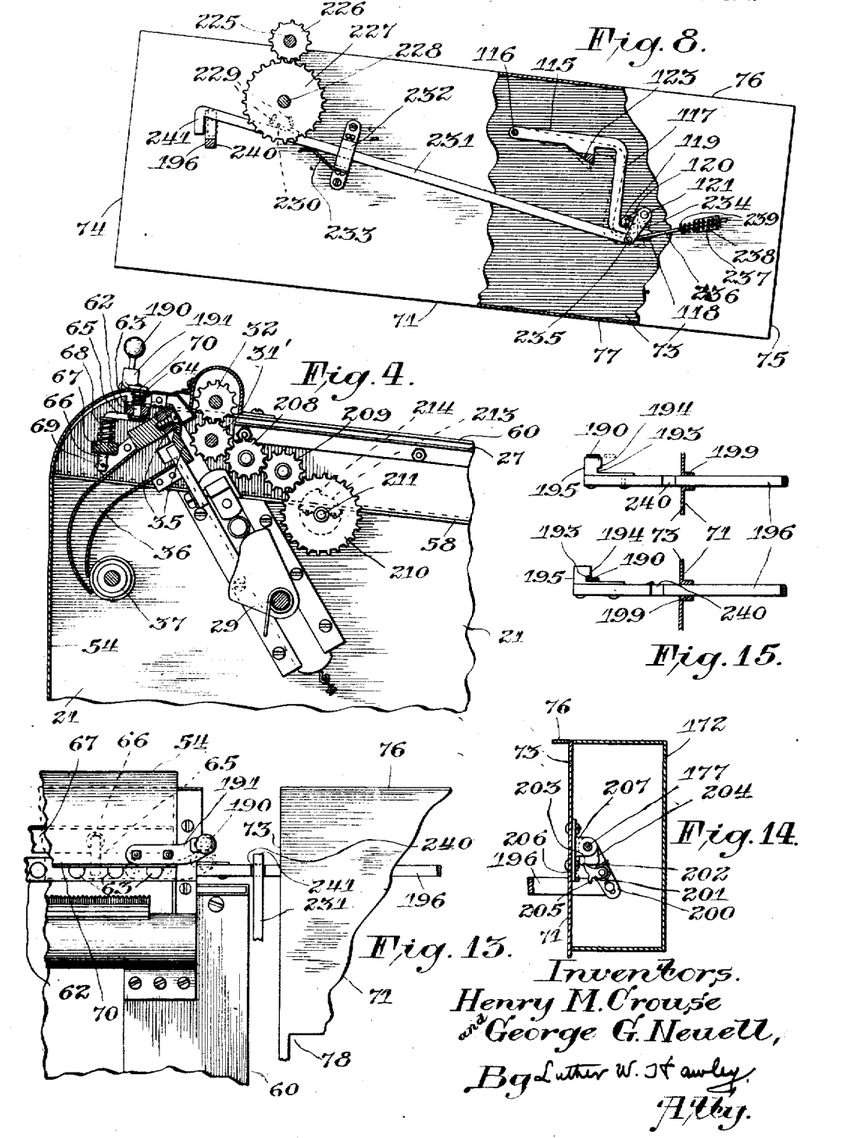
Fig. 4 is a detail view partly in section, illustrating the paper feeding rollers of the autographic register and the locking mechanism used in connection therewith.
Fig. 8 is a detail view partly in section illustrating the interlocking connection between the feeding mechanism of the autographic register and the striking bar of the recording machine.
Fig. 13 is a plan view of the rear portion of the autographic register and recording machine showing in plan the construction shown in Fig. 12.
Fig. 14 is an enlarged detail view illustrating the construction shown at the right in Fig. 12.
Fig. 15 is a plan view partly in section, showing the different positions of adjustment of the locking member for the autographic register casing and the slide bar operated thereby, this construction being shown in elevation in Fig. 12.

As shown in Figs. 3 and 4, the bar 62 contacts with an arm 65 carried by the upper end of a spindle 66 which is slidably mounted in a transverse bar 67 suitably secured to the side walls of the register casing. A spring 68 is interposed between the arm 65 and the transverse bar 67 and normally presses the arm 65 upwardly, the spindle 66 being provided with a pin 69 to limit its upward movement. The front portion 70 of the rear hinged wall 54 contacts with the pins 63 as it is thrown into its closed position, forcing these pins downwardly thereby forcing the feeding rollers into contact with each other. However, before the rear wall 54 can be thrown into its closed position the operator must press downwardly on the rear portion of the cover plate 60 in order to force the transverse bar 62 downwardly against the pressure of the springs 68 carried by the spindles 66. Therefore it will be seen that a positive and complete closing of the casing and inter-engagement of the feeding rollers is necessitated before the paper feeding mechanism is in operative position, the spring 68 being sufficiently strong to hold the feeding rollers out of engagement with each other and out of cooperative relation with each other until manual pressure is exerted to force these rollers into coactive relation.

Further mechanism for insuring the proper adjustment of the feeding mechanism will be hereinafter described.

The construction of the recording machine will next be described, and in connection therewith attention is directed to Figs. 7 to 15 inclusive, of the drawings.

Figure 7:
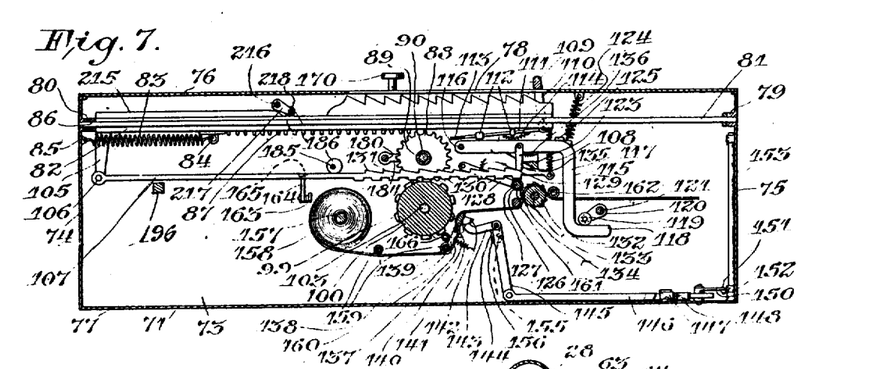
Fig. 7 is a longitudinal sectional view of the recording machine.

The recording machine includes a casing 71 suitably supported on legs 72 and having side walls 73, a rear wall 74 and a hinged front wall 75, the front wall being hinged at one end to one of the side walls. The machine is also provided with a top wall 76 and a bottom wall 77, the top wall having intermediate its front and rear ends a rectangular opening 78 through which the selector bars of the recording machine are operated. A series of sockets 79 and 80 is provided, the sockets 79 being secured to the front walls and the sockets 80 to the rear walls, the sockets 80 being disposed in longitudinal alinement with the sockets 79. These sockets support a series of longitudinally disposed bars or trackways 81, and a series of selector keys 82 is slidably mounted on the trackways 81, the keys 82 being normally held at the rear of the machine by means of springs 83 secured at their front ends to eyes 84 carried by the selector keys, and at their rear ends to the wall 74 of the casing as shown at 85. The selector keys abut at the rear ends against the cushioning strip 86 mounted on the trackways and adjacent the supporting sockets 80 at the rear of the casing. Formed upon each selector key on its under-surface is a series of rack teeth 87 and these teeth are adapted to mesh with pinions 88 journaled upon a transversely disposed shaft 89 having its opposite ends carried by the side walls of the casing. Formed integral with each pinion 88 and upon one side thereof is a hub 90, said hub having oppositely disposed radial arms 91 and 92 upon which are mounted spring actuated pawls 93 and 94 respectively, the pawl 93 being adapted to engage with the teeth of a ratchet wheel 95 secured to a transmission gear 96 loosely journaled on the shaft 89. The pawls 94 are provided for the purpose of reversing the direction of rotation of the gear wheels 88, these pawls meshing with the teeth of a ratchet wheel 98 which are reversely disposed relative to the teeth of the ratchet wheel 95. The construction of the mechanism coöperating with these pawls will be described more fully later in the specification.

Upon each of the pinions 88 and the transmission gears 96 on the shaft 89 are spacer sleeves 97. Meshing with each transmission gear 96 is a gear 99 secured to a totals wheel 100, and each of these totals wheels has formed on one side thereof a hub 101 to which is integrally secured an intermittently operated ratchet wheel 102. All of the parts 99, 100, 101 and 102 are loosely mounted on a transversely and horizontally disposed shaft 103 journaled in bearings carried by the side walls of the casing.

Depending from the rear ends of each of the selector keys 82, is an extension 105, and pivotally connected with each of said extensions at one end as shown at 106 is a combined stop and numeral bar 107, each of said bars being supported at its opposite end by means of a spring 108 connecting it with the forward end of one of the selector keys 82. Located adjacent the front end of the rectangular opening 78 is a transversely disposed stop bar 109 extending the full width of the opening and provided with depending portions 110 at its opposite ends, which are pivoted near their centers to the side walls of the casing and are pivotally connected at their lower ends to the front ends of bars 111 slidably mounted in ways 112 secured to the side walls of the casing, the bars being connected at their rear ends to a transversely disposed tooth engaging bar 113 adjacent the pinions 88. Tension springs 114 are provided to normally press the bars 111 forwardly out of engagement with the pinions 88, these springs being connected at their opposite ends respectively to the bars and to a fixed part of the mechanism.

The construction of the mechanism utilized in the recording machine for making the record will next be described.

Angularly disposed lever arms 115 are pivoted at their rear ends as shown at 116 to the side walls of the casing and are provided intermediate their ends with a downwardly extending portion 117 and at their lower ends with forwardly extending portions 118. The forwardly extending portions 118 are positioned to be engaged by pressure rolls 119 journaled upon the free ends of arms 120 secured to a transversely disposed rock shaft 121 journaled in suitable bearings carried by the side walls of the casing. A striking bar 123 is disposed transversely across the machine and has its opposite ends secured to the lever arms 115 intermediate their ends. In order to retain the striking bar in an inactive position, tension springs 124 are provided, these springs having their lower ends connected with the levers 115 and their upper ends connected with the upper wall of the casing, stop blocks 125 being secured to the side walls of the casing for limiting the upward swing of the free ends of the levers 115.

Located under and adjacent the front ends of the stop and numeral bars 107 is an inking roller 126 which is journaled upon a shaft 127 which in turn is swingingly carried by the front ends of arms 128 having their rear ends pivotally connected with the side walls of the casing. Tension springs 129 are connected with the arms and hold the inking roller in engagement with the numeral blocks 130 formed on the under surfaces of the bars 107. Each of said numeral bars has formed on its upper side a series of engaging members 131, these members being spaced apart and disposed on said bars above and opposite the numeral blocks 130. The feeding roller 132 is disposed adjacent the inking roller 126 and extends transversely across the casing parallel with the inking roller. This feed roller is rotatably mounted upon a shaft 133 having its opposite ends secured to the side walls of the casing. Ratchet wheels 134 are secured to the opposite ends of the feed roller, the teeth of these ratchet wheels being engaged by spring-actuated pawls 135 which are pivoted at their upper ends to the lever arms 115, their lower ends normally being held in engagement with the teeth of the ratchet wheels by means of springs 136.

Figure 1:
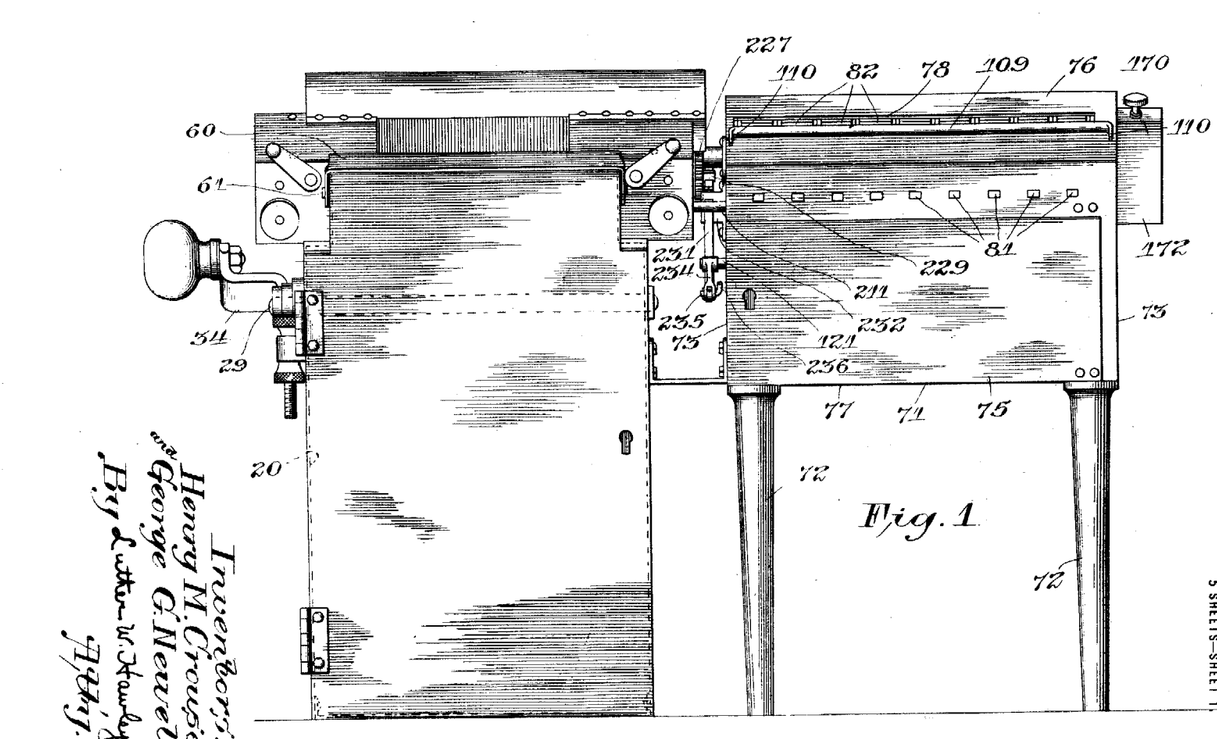
Figure 1 is a front elevation of our combined machines.
Figures 2, 16:
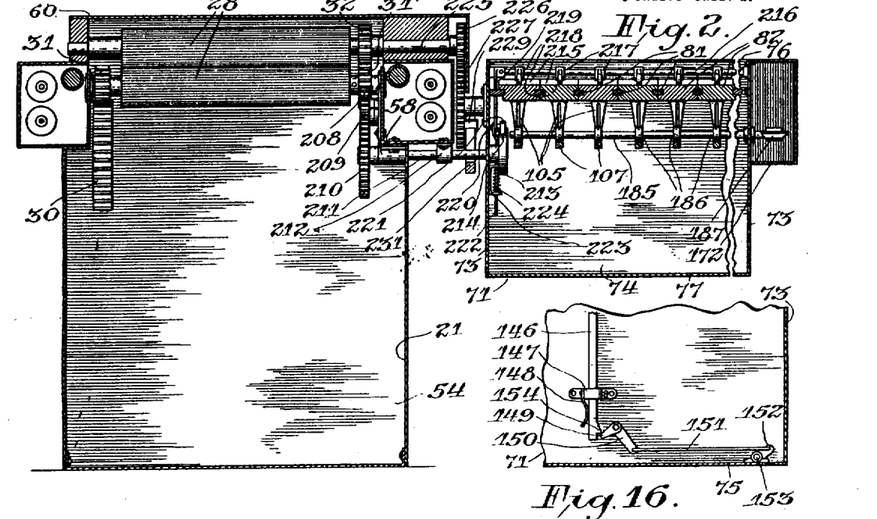
Fig. 2 is a vertical sectional view of the construction illustrated in Fig. 1.
Fig. 16 is a plan view of the operating mechanism for recording the totals.

Extending transversely across the case parallel with the axes of and adjacent to the totals wheel 100 is a striking bar 137 having depending arms 138 pivoted on shaft 139 journaled in the casing of the recording machine. The striking bar is held in inactive position by means of tension springs 140, these springs 140 holding the bar against stop members 141 secured to the walls of the casing. The striking bar 137 is actuated by means of the engagement of a forwardly extending arm 142 with a striking lever 143 secured to a rock shaft 144. A depending lever 145 has its upper end secured to the shaft 144 and its lower end pivotally connected with the rear end of a link 146, the front end of said link being slidably mounted in a bracket member 147 secured to the bottom of the casing. The front end of the link 146 is also permitted a limited lateral swinging movement and is normally pressed by means of a plate spring 148 in a direction to be engaged by an arm 149 of a bell crank lever, the remaining arm 150 of the bell crank lever being pivotally connected by means of a link 151 to an arm 152, which in turn is secured to a vertically disposed hinge member 153, the latter turning with the hinged front wall 75 of the casing.

The front end of the link member 146 is provided with a laterally disposed inclined block member 154 at one side thereof adjacent the free end of the arm 149 of the bell crank lever, which arm is adapted to engage with the end of the block 154 in a manner to push the link member 146 rearwardly and thereby rock the shaft 144 in a direction to cause the striking lever 143 secured thereto to swing the striking member 137 toward the axis of the totals wheels 100, when the hinged front wall 75 of the casing is opened. When the wall is closed the front end of the arm 149 rides upon the inclined portion of the block 154, thereby pushing the free end of the link member 146 laterally against the pressure of the plate spring 148 until the arm 149 passes the shoulder upon the block and the spring 148 returns the link member to its normal position. A stop member 155 is secured to the side wall of the casing and is adapted to engage with the arm 156 secured to the rock shaft 144 in order to limit the rocking movement of the shaft in one direction. This construction is fully described in our co-pending application, Serial No. 92,092, filed April 19, 1916, and a more complete illustration in this application is therefore deemed unnecessary.

The roll of record paper 158 is mounted on a transversely disposed shaft 157 near the center of the casing of the recording machine, this paper being adapted to receive printed characters during the operation of the machine. The paper from the roll passes under guide rollers 159, one of the guide rollers being journaled on the shaft 139 of the striking bar 137. After passing under the guide rollers the paper is conducted between a roller 160 which is carried by the arms 138 of the striking bar 137, and from the striking bar it passes under another roller 161 and around the periphery of the feed roller 132 and thence under the roller 162 toward the front of the machine, where it is loosely retained in a semi-folded form, or, if desired, may be wound upon an automatically operating receiving roll. Extending across the casing below the bars 107 and adjacent to the paper roll 158 is a supporting bar 163 having its opposite end secured to the side walls of the casing. Pivotally mounted upon said bars is a series of spring actuated retaining hooks 164, which are adapted to engage against one side of each of the stop and numeral bars 107. Formed on the upper side of each bar 107 adjacent the point of engagement of the hooks 164, are cut-away inclined gaps 165. This construction is fully described in the patent to Tillman, No. 1,120,347, issued December 8, 1914, and since *per se* it forms no part of the present invention, further illustration and description is deemed unnecessary.

An inking roller 166 is located adjacent the underside of the totals wheels 100 and bears against said wheels in order to properly condition them for the making of a record.

Before describing the interlocking connections between the autographic register and the recording machine, the operation of the recording mechanism will be described.

When the operator desires to make a record upon this machine, he directs the fingers of his hand to the selected numbers as shown on the upper surface of the selector keys. The selector keys are drawn toward the front of the machine until the fingers of the operator engage against the stop bar 109, and as each selector bar 82 is moved, the rack teeth 87 formed upon the underside thereof will engage one of the pinions 88. By reason of each pinion having hub portion 90, the pawl 93 which is carried by said hub will engage the ratchet wheel 95 and the ratchet wheel 95 will then carry the transmission gear 96 which in turn will rotate the totalizing wheel 100 through the gear 99. As each selector key is moved it carries with it the combined stop and numeral bar 107, and as these members are stopped by the engagement of the operator's finger with the stop bar 109, the engaging members 131 carried by the stop and numeral bars will be engaged against the striking bar 123 and will be held thereby in the advanced position until after the recording is completed. After the desired selector keys have been moved forward and are held in position for recording by the operation just described, the shaft 121 is rocked in a direction to cause the pressure rolls 119 to bear upon the forwardly projecting portions 118 of the levers 115, and the striking bar 123 which is carried by said levers will be moved downwardly, forcing the bars 107 downwardly so that the numeral blocks 130 carried by the underside of these bars will bear against the paper ribbon, the ribbon being engaged by the upper periphery of the feed roller 132. The numeral blocks having passed over the inking roller 126, will make the impression upon the paper of the proper number. After the record has been made the shaft 121 is rocked in an opposite direction and the striking bar 123 is relieved of pressure and is returned by springs 124 to its normal position, and during this operation the spring actuated pawls 135 which are carried by the striking bar, will engage with the ratchet wheels 134, thereby turning the paper sheet on which the numerals have been recorded, one space, so as to be ready for the next selected number. At the time the striking bar 123 depressed the bars 107, said bars were depressed to such an extent that the top portions thereof were engaged by a part of their spring retaining hooks 164; as the striking bar 123 was returned to its normal position the bars 107 of the selected numbers were held down so that the engaging members 131 of said numbers could pass under the striking bar 123 as said bars 107 and the selector keys were returned to their normal positions by the springs 83. This construction and operation is fully described in the patent to Tillman above referred to, and a further description of the operation is therefore omitted from this specification.

As the selector keys 82 are drawn forward in the order in which the bars are selected and are engaged by the operator's fingers, the fingers upon engaging the stop bar 109 will move the stop bar, thus carrying the engaging bar 113 into engagement with the teeth of the transmission gears 88. This acts to positively stop said gears and prevent their passing beyond their intended degree of movement. Each of the gears 96 has mounted thereon a projection 169, which, upon the continued rotation of the selector keys in the order of recording, will engage with the respective intermediate wheel 102 so as to carry the numeral wheel 100 to the next order, after a column of figures has been brought down and recorded by the actuation of the selector keys. This construction is also described in the Tillman patent, and further description is therefore deemed unnecessary.

Figure 9:
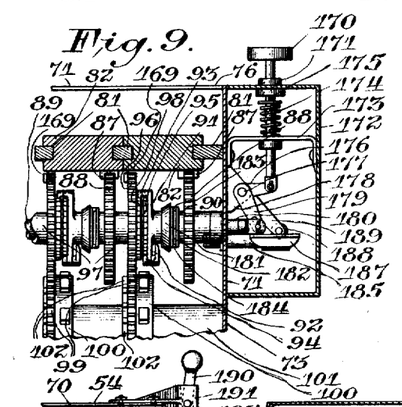
Fig. 9 is an enlarged view illustrating the construction of the correction key for the recording machine.
Figure 10:
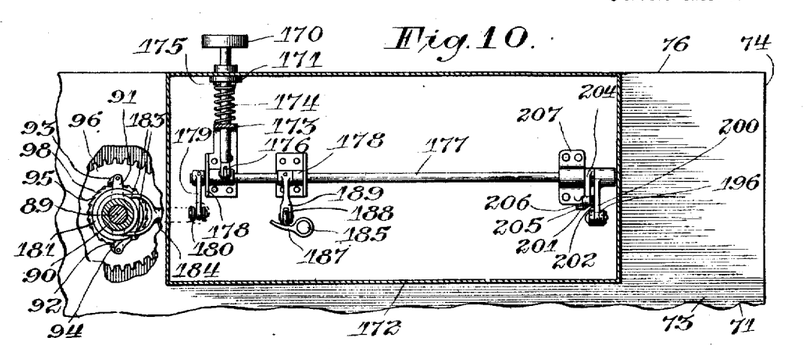
Fig. 10 is a side elevation of the construction shown in Fig. 9.

In addition to the structure of the recording machine above described, we have provided means whereby the operator may clear the machine and return the selector keys to their normal or zero position where a mistake has been made in manipulating any of the keys, or for some other reason it is desired to return the keys to their normal position without making a record. The means provided for performing this function includes a correction key 170, slidable vertically through a bearing member 171 carried by a supplementary casing 172 secured to the casing of the recording machine. The body or shank portion of the key 170 is received by an opening in a cross bar 173 having its opposite ends secured to the side walls of the supplementary casing. A compression spring 174 normally forces the key in an upward direction, the spring being mounted between the upper wall of the supplementary casing and the pin 175 carried by the key. The lower end of the key is pivotally connected to the free end of an arm 176 secured to a rock shaft 177 journaled in bearings 178. A lever arm 179 is secured to the front end of the rock shaft and at its free end is pivotally connected with an extended end of a longitudinally movable bar 180 carried by bearings secured to the side walls of the main casing of the recording machine.

Referring back to the description of the construction shown in Fig. 9, pawl 94 is normally disengaged from the ratchet wheel 98, and conical rings 181 are slidably mounted upon the hub members 90 and are provided with peripheral channels 182 upon their hub portions which receive the forked ends 183 of clutch shipping members 184, which are secured to the bar 180 above mentioned. These clutch shipping members are operated to move the conical rings 181 into engagement with the pawls 94 and cause them to engage with the ratchet teeth on the wheels 98 in a manner to reverse the rotation of the transmission gear wheels 96 and 99 when the selector keys 82 are retracted. Means are also provided for disengaging the stop and numeral bars 107 from the striking or engaging bar 123 when the correction key 170 is depressed, this means including a rock shaft 185 journaled in bearings carried by the side walls of the casing and located centrally thereof above the stop bars 107, eccentric rollers 186 being secured to the shaft 185 and being spaced apart in a manner to engage with the upper surfaces of the stop bars. A fan shaped arm 187 is secured to the end of the shaft 185 that extends into the casing 172, and this arm engages with a roller 188 carried by wiper arm 189 which is secured to the shaft 177. Thus it will be seen that as the correction key 170 is depressed, the roller 188 will engage the arm 187 and will rock the shaft 185, causing the eccentric rollers 186 to depress the stop bars 107 sufficiently to disengage them from the striking bar 123, but not far enough to cause them to engage with the ribbon of paper. When the bars 107 are disengaged, the selector keys are retracted as before described, and the operator may then proceed to manipulate the recording machine in a manner to record the desired amount.

In addition to the means above described for operating the correction and retraction mechanism for the selector keys, additional means has been provided whereby these keys will be automatically retracted to their normal or zero position when the feeding mechanism for the autographic register has been placed in proper adjustment for the operation of the machine. This means will now be described and attention is directed to Figs. 9 to 15 inclusive.

As set forth in the early part of the specification, the upper feed roller for the autographic register is carried by the hinged casing 60, and when this casing is lifted in order to obtain access to the interior of the register, the feed rollers are thrown out of adjustment. In order to throw these rollers into proper adjustment, the hinged lever 60 is lowered and is manually forced downwardly against the action of the springs 68 to a position where the rear hinged wall of the autographic register can be closed in order to hold the cover plate in the closed position and to hold the feed rollers in operative contacting relation. Locking means in addition to the lock 56, 57, described in the early part of the specification, has been provided, and this locking means in the present embodiment takes the form of a pivoted locking lever 190 mounted in a bracket 191 secured to one side of the rear hinged portion 54 of the autographic register. The lower end of this locking lever is normally pressed inwardly by a strong leaf or flat spring 192, this spring exerting a considerable pressure against this lever. In order to open the hinged wall 54, the upper end of the locking lever must be forced inwardly or in an anti-clockwise direction (see Fig. 12), thereby forcing the lower end of the locking lever out of a notch 193 formed between an overhanging portion 194 of a lug 195 secured to one side of a slide bar 196. This bar is slidably mounted in the side walls of the casing of the recording machine as shown at 199 in Fig. 12, and is normally pressed in a direction away from the casing of the autographic register by means of a spring 197, which bears at one end against a collar 198 carried by an offset portion 198' carried by the bar, and at its other end against one side wall 73 of the casing. The slide bar at its right hand end (see Fig. 12) projects from the right hand side wall into the supplementary casing 172 which houses the correction key mechanism, the right-hand end of this bar being connected by a pin and slot connection to the lower end of an arm 200 pivotally mounted on the shaft 177 which operates the clutch mechanism for retracting the selector keys, this operation having been previously fully described in the specification. There is pivotally mounted on the arm 200 (see Fig. 14) intermediate its ends a pawl 201 which is normally pressed upwardly by a spring 202 into contact with a notch 203 formed in the lower surface of a cam member 204 fixedly secured to the shaft 177. The pawl 201 is also provided with a downwardly projecting arm 205 which is adapted to engage with a stop 206 carried by a bracket 207 in which the extended end of the shaft 177 is journaled, this bracket being secured to the side wall of the casing of the recording machine.

The operation of opening and closing the rear hinged wall 54 of the autographic register and the resultant operation of the correction key mechanism will now be briefly set forth.

In order to open the wall 54 the upper end of the lever 190 is forced toward the left (see Fig. 12) out of engagement with the notch 193, and the hinged wall 54 and lever may then be swung rearwardly giving access to the interior of the register. As the lever 190 is retracted from the lug 195 on the end of the slide bar 196, the slide bar will be forced toward the right under the action of its spring 197, thereby carrying the arm 200 and the pawl 201 toward the right to a position where the pawl 201 will engage with the notch 203 formed in the lower end of the cam member 204 which is secured to the shaft 177. When the hinged wall 54 is closed the upper end of the locking lever 190 must be held toward the left until the lower end passes the stop 195 and comes in contact with the bar 196. When the lever is in this position the upper end can be released and the spring 192 will force the lower end of the lever into the notch 193. The spring 192 is made sufficiently heavy to overcome the action of the spring 197, and the bar 196 will therefore be pushed toward the left and through the engagement of pawl 201 with the notch 203 in cam 204, the shaft 177 which operates the correction key clutch mechanism, will be rotated, and the selector keys will be returned to their normal inoperative or zero position in the manner fully set forth previously in the specification.

When the slide bar 196 and pawl 201 are forced toward the left (see Figs. 12 and 14), the projection 205 on the pawl 201 will engage with the stop 206 thereby disengaging the pawl from the notch on the cam member and releasing the correction key mechanism. This mechanism may thereafter be operated at will by the manipulation of the correction key without interference from the locking mechanism for the autographic register.

As above set forth in the objects of the invention, one of the objects is to insure the operation of at least one of the selector keys before the feeding mechanism of the autographic register can be operated, and the structure for carrying out this object will next be described.

Figure 11:
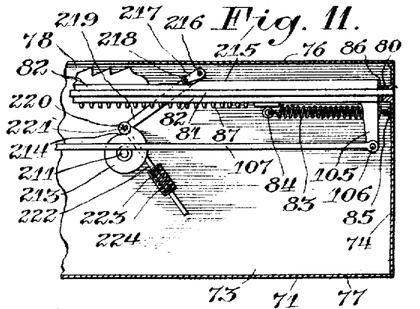
Fig. 11 is a detail sectional view partly broken away, illustrating the interlocking connection between the selector bars of the recording machine and the feeding mechanism of the autographic register.

Referring to Figs. 2 and 4, the lower feed roll is provided at one end as above set forth in the specification, with a gear 31' which meshes with an idler gear 208 journaled on a suitable stub shaft carried by the side wall of the register casing, and this idler gear in turn meshes with a second idler gear 209 also carried by a suitable stub shaft. The idler 209 in turn meshes with a gear 210 carried by a shaft 211 which is journaled in suitable bearings carried by the side wall of the register casing and extends through the wall of the register through bearing 212 carried by the bottom of the casing which supports the carbon paper rolls, and through the adjacent wall of the recording machine. The shaft 211 has secured thereto on its end which projects into the recording machine, a cam 213 provided with notch 214 in its periphery; suitable locking means is provided for engagement with the notch in the cam whereby the rotation of the lower feed roll of the autographic register is prevented until at least one of the selector keys has been operated, and this locking mechanism is illustrated in Fig. 11. Each of the selector keys 82 is provided on its upper surface with a raised track 215, these tracks being positioned adjacent the rear ends of the keys. A shaft 216 suitably journaled in the side walls of the casing of the recording machine is provided with a series of arms 217 which are fixedly secured to the shaft and are provided on their lower ends with rollers 218 positioned to engage the tracks 215 carried by the selector keys. There is also pivotally secured to the shaft 216 a link 219 which carries at its lower end a pin 220; this pin has secured thereto at one end a roller 221 positioned to engage the notch 214 in the cam 213, and the pin carries at its opposite end a pivotally connected link 222 which is slidably secured to a bracket 223 on the side wall of the casing of the recording machine, a spring 224 being carried by said bracket and normally forcing the link 222 in a downward direction whereby the roller 221 will be forced into engagement with the periphery of the cam.

From the above description it will be seen that as any one of the selector keys is operated, one of the rollers 218 carried by its corresponding arm 217 will be lifted upon the track 215 thereby rotating the shaft 216 and lifting the link 219 to a position where the roller 221 is disengaged from the notch 214 in the cam, thereby permitting free rotation of the shaft 211 and of the feed rollers of the autographic register.

Another object of the invention set forth above was to necessitate the operation of the striking bar of the recording machine whenever the feeding mechanism of the autographic register was operated, thereby insuring the making of a record in the recording machine, and the apparatus for performing this function will next be described, and attention is directed to Figs. 2, 8, 12, and 13.

As shown in Fig. 2, the shaft for the upper feed roller is extended as indicated at 225, and the extension 225 carries at its outer end a gear wheel 226. The gear wheel meshes with gear 227 carried by a stub shaft 228 journaled in suitable bearings carried by the casing of the recording machine. The outer surface of the gear 227 is provided with a lug 229 which is positioned to engage once during every revolution of the gear with an upwardly projecting lug 230 carried by a slide bar 231 mounted in a bracket 232 carried by the side wall of the casing of the recording machine. A leaf spring 233 is also secured to the bracket 232 and normally forces the slide bar against the upper wall of the slotted guideway in the bracket in a position to be engaged by the lug 229. The slide bar 231 has pivotally connected thereto at its lower end an arm 234 which is secured at its opposite end to the shaft 121 which operates the striking bar. The pivot pin 235 which connects the lower end of the arm 234 with the bar 231 has also secured thereto a link 236 having its opposite end slidably mounted in a bracket 237 secured to the casing of the recording machine, the link 236 being pressed downwardly and toward the rear of the recording machine by means of a spring 238 which bears at one end against the bracket 237 and at its opposite end against the collar 239 fixed on the link.

The structure described just above operates as follows: As the feeding rollers, and more particularly the upper feeding roller, of the autographic register, are rotated to deliver a strip of paper, the gear wheel 227 will also be rotated, and the lug 229 will come into contact with the lug 230 carried by the slide bar 231 and will move said slide bar lengthwise, thereby actuating the arm 234 in a manner to rotate the shaft 221, force downwardly the roller 119 thereby swinging the levers 117 and guiding the striking bar 123 in a direction to make a record on the recording machine.

Another object of the invention set forth above was the locking of the recording mechanism on the recording machine against movement when the feeding mechanism on the autographic register is out of adjustment, and this construction will next be described, and attention is directed particularly to Figs. 8, 12, and 13.

Figure 12:
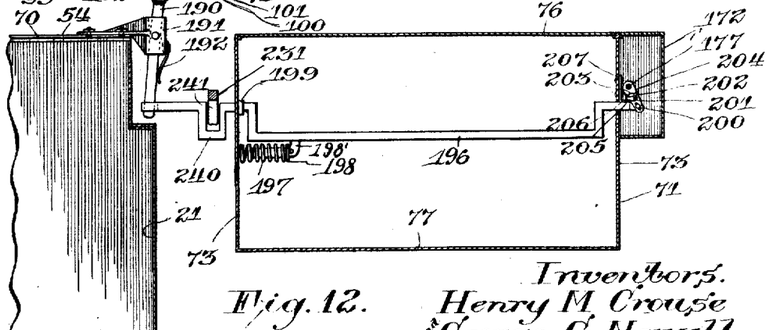
Fig. 12 is a detail view partly in section illustrating the connection between the spindle operated by the correction key and the mechanism for the casing of the autographic register, which latter insures the proper adjustment of the feeding rollers of said register.

As shown particularly in Fig. 12, the slide bar 196 is provided with an offset portion 240 which is so positioned when the rear hinged wall of the autographic casing is closed and the feeding mechanism is in operating position as to permit lengthwise movement of the slide bar 231. This slide bar is provided at its upper end with an overhanging or hooked portion 241 which slides through the slot formed by the offset portion 240 when the machines are in proper adjustment. However, when the hinged wall 54 of the casing is opened in order to adjust the feeding mechanism of the autographic register, or to obtain access to the interior of the casing of the autographic register, the slide bar 196 is moved toward the right, thereby interposing a portion of the bar 196 in the path of the hooked end 241 on the slide bar 231. This effectually prevents the longitudinal movement of the bar 231 and therefore prevents the making of a record in the recording machine until the feeding mechanism of the autographic register has been again placed in operative position and the rear wall of the casing of the autographic register has been closed to lock the feeding mechanism in proper operative adjustment.

In view of the fact that the operation of each of the constructions described has been set forth after the descriptions of the particular constructions have been completed, it is believed that a further detailed description of the operation of the machine will be unnecessary.

From the above specification, however, it will be seen that we have provided a practical and efficient machine for carrying out the objects of the invention, and that our improved machine effectually connects together the operations of the two machines in such a manner that neither machine can be operated without making a record on the other machine, and in such a manner that the machine cannot be operated until all the essential parts thereof are in proper adjustment to make and deliver accurate records.

While we have in the above specification described one embodiment of our invention, it should be understood that it is not our intention to limit ourselves to the specific construction described, but that further embodiments may be employed without departing from the spirit and scope of the invention as expressed by the following claims:

1. In a machine of the class described, a recording machine, paper feeding mechanism and recording mechanism carried by said recording machine, an autographic register, paper feeding mechanism for said register, and means actuated by the paper feeding mechanism of said register for operating said recording machine to make a record therein.

2. In a machine of the character described, a recording machine, recording mechanism carried thereby, an autographic register, paper feeding mechanism for said register including feeding rollers, and means operatively connected to and actuated by one of said feeding rollers for operating said recording mechanism.

3. In a machine of the character described, a recording machine, recording mechanism carried thereby, an autographic register, paper feeding mechanism for said register including feeding rollers, and means actuated by one of said feeding rollers for operating said recording mechanism.

4. In a machine of the character described, a recording machine, recording mechanism carried thereby, an autographic register, paper feeding mechanism for said register including feeding rollers, means including a gear wheel operatively connected to one of said rollers, and a slide bar adapted to be actuated by said gear wheel for operating said recording mechanism.

5. In a machine of the class described, a recording machine including a series of selector keys and a striking bar, an autographic register, paper feeding mechanism therefor, and means actuated by said feeding mechanism for operating said striking bar.

6. In a machine of the class described, a recording machine including a series of selector keys and a striking bar, an autographic register, paper feeding rollers carried thereby, and means actuated by one of said feeding rollers for operating said striking bar.

7. In a machine of the class described, a recording machine including a series of selector keys and a striking bar, an autographic register, paper feeding rollers carried thereby, and means including a reciprocable member actuated by one of said feeding rollers for operating said striking bar.

8. In a machine of the class described, a recording machine, means for operating said recording machine, an autographic register, paper feeding means therefor, means for locking said feeding means against movement, and mechanism for releasing said locking means actuated by the means for operating said recording machine.

9. In a machine of the class described, a recording machine, selector keys for operating said recording machine, a normally accessible autographic register, paper feeding means therefor, means for locking said feeding means against movement, and releasing mechanism for said locking means controlled by the selector keys of said recording machine.

10. In a machine of the character described, a recording machine, means for operating said recording machine, an autographic register, paper feeding rollers for said autographic register, means for locking said feeding rollers against movement, and releasing mechanism for said locking means controlled by the means for operating said recording machine.

11. In a machine of the class described, a recording machine, selector keys for operating said recording machine, an autographic register, paper feeding means including feed rollers for said register, a shaft, operative connections between said shaft and said feed rollers, and means carried by said shaft and controlled by said selector keys for locking said feed rollers against movement.

12. In a machine of the class described, a recording machine, selector keys for operating said recording machine, an autographic register, paper feed rollers therefor, a cam operatively connected to one of said feed rollers, and means controlled by said selector keys and coöperating with said cam to lock said feed rollers against movement.

13. In a machine of the class described, an autographic register including inter-engaging paper feeding members, a recording machine, recording mechanism therein, means controlled by said paper feeding members for operating said recording mechanism, and means for locking said last named means against operative movement when the paper feeding members are out of operative engagement with each other.

14. In a machine of the class described, a recording machine, recording mechanism carried thereby, an autographic register, feeding mechanism carried thereby, means operatively connecting said feeding mechanism to the recording mechanism of said recording machine, and means for preventing movement of said connecting means when said feeding mechanism is out of operative adjustment.

15. In a machine of the character described, a recording machine, recording mechanism carried thereby, an autographic register, paper feeding mechanism for said autographic register, means actuated by said feeding mechanism for operating said recording machine, and means for locking said last named means against movement when said paper feeding mechanism is out of proper adjustment.

16. In a machine of the character described, a recording machine, recording mechanism carried thereby, an autographic register, paper feeding mechanism for said register including feeding rollers, means operatively connected to one of said rollers for operating said recording machine, and means for locking said last named means against movement when the paper feeding rollers are out of proper adjustment.

17. In a machine of the character described, a recording machine, recording mechanism carried thereby, an autographic register, paper feeding mechanism for said register including feeding rollers, a gear wheel operatively connected to one of said rollers, a slide bar adapted to be actuated by said gear wheel and operatively connected to said recording mechanism, and means for preventing the actuation of said slide bar when the feeding rollers of said autographic register are out of proper adjustment.

18. In a machine of the character described, a recording machine including a series of selector keys and a striking bar, an autographic register, paper feeding mechanism therefor, means actuated by said feeding mechanism for operating said striking bar, and means for locking said last named means against movement when the paper feeding mechanism of said register is out of proper adjustment.

19. In a machine of the character described, a recording machine, recording mechanism carried thereby, an autographic register, paper feeding mechanism for said register, a slide bar having a hooked end, operative connections between said slide bar and said feeding mechanism, and means for engaging the hooked end of said slide bar for preventing the operation thereof when the feeding mechanism of the register is out of adjustment.

20. In a machine of the class described, a recording machine, recording mechanism carried thereby, an autographic register having a hinged wall, feeding mechanism for said register, means actuated by said feeding mechanism for operating the said recording mechanism, and means controlled by said hinged wall for preventing movement of said first named means.

21. In a machine of the class described, a recording machine, recording mechanism carried thereby, an autographic register, feeding mechanism carried by said register, means actuated by said feeding mechanism for operating said recording mechanism, and means including a hinged member for locking said first named means against movement when said feeding mechanism is out of operative adjustment.

22. In a machine of the class described, a recording machine including recording mechanism, an autographic register, paper feeding mechanism therefor, and means for retracting the recording mechanism of said recording machine to normal inoperative position when the feeding mechanism of said autographic register is placed in proper feeding adjustment.

23. In a machine of the class described, a recording machine, a series of selector keys carried thereby, an autographic register, coacting paper feeding members carried thereby, and means operatively connected with said paper feeding members for retracting said selector keys to normal or zero position when said paper feeding members are thrown into operative coactive adjustment.

24. In a machine of the character described, recording mechanism including a series of selector keys, an autographic register, paper feeding mechanism carried thereby, means for locking said paper feeding mechanism in operative position, and means controlled by said locking member for retracting said selector keys to their normal position.

25. In a machine of the class described, an autographic register, paper feeding means carried thereby, a recording machine including a series of selector keys, a locking member for locking the feeding mechanism of said register in an operative position, and means carried by said recording machine and adapted to engage with said locking member for retracting said selector keys when said paper feeding mechanism of the autographic register is placed in proper adjustment and is locked in said position.

26. In a machine of the class described, an autographic register, a recording machine, selector keys carried by said recording machine, and means carried by said autographic register for controlling the retraction of the selector keys in said recording machine to normal position.

27. In a machine of the class described, a recording machine, a plurality of selector keys carried thereby, means for retracting said selector keys, an autographic register and a plurality of controlling means carried by said autographic register and by said recording machine for said retracting means.

28. In a machine of the class described, a recording machine, a plurality of selector keys carried thereby, an autographic register including a hinged wall, means for locking said wall in closed position, and means controlled by said locking means for retracting said selector keys to normal position.

29. In a machine of the class described, recording mechanism, a plurality of selector keys carried thereby, an autographic register, feeding mechanism carried thereby, means for locking said mechanism in operative position, and means controlled by said locking means for retracting said selector keys to normal or zero position.

30. In a machine of the class described, a recording machine including recording mechanism, an autographic register including a casing having a hinged wall, a feed roller carried by said hinged wall, a second roller adapted to coact with said first named feed roller, means actuated by one of said feeding rollers for operating said recording mechanism, and means controlled by said wall for preventing the operation of said rollers when said rollers are out of coactive engagement with each other.

31. In a machine of the class described, a recording machine including recording mechanism, an autographic register having a hinged wall, a feed roller carried by said hinged wall, a second feed roller carried by said register and adapted to coact with said first named feed roller, means actuated by one of said feeding rollers for operating said recording mechanism, means for actuating said rollers, and means for preventing the actuation of said rollers when said rollers are out of operative engagement with each other.

32. In a machine of the class described, a recording machine including recording mechanism, an autographic register having a hinged wall, a feed roller carried by said wall and adapted to coact with the second roller carried by said register, means for actuating said rollers, means actuated by one of said feeding rollers for operating said recording mechanism, and means controlled by said hinged wall for preventing the actuation of said rollers when said rollers are out of operative engagement with each other.

33. In a machine of the class described, a recording machine, means for operating said recording machine, an autographic register having normally inoperable feeding means, and means requiring an operation of said recording machine operating means for rendering said feeding means operable.

34. In a machine of the class described, the combination with a recording machine having operating mechanism, of an autographic register having feeding devices, and operative connections between said feeding devices and said operating mechanism requiring an operation of said operating mechanism to render said feeding devices operable.

35. In a machine of the class described, the combination with a recording machine having operating mechanism, of an autographic register having feeding rollers and operative connections between said feeding rollers and said operating mechanism requiring an operation of said operating mechanism to render said feeding rollers operable.

36. In a machine of the class described, a recording machine, recording mechanism carried thereby, an autographic register, paper feeding rollers carried thereby, a member rotatable by said feeding rollers and means requiring an operation of said recording machine for rendering said member rotatable.

37. In a machine of the class described, a recording machine, operating mechanism therefor, an autographic register, feeding mechanism therefor, a member operable by said feeding mechanism, and means requiring an operation of the operating mechanism of said recording machine for rendering said member operable.

38. In a machine of the class described, a recording machine, operating mechanism therefor, an autographic register, feeding rollers therefor, a member geared to said feeding rollers and rotatable thereby, and means controlled by said operating mechanism of said recording machine for preventing the operation of said member.

39. In a machine of the class described, an autographic register, feeding mechanism therefor, means for locking said feeding mechanism in operative adjustment, a recording machine, recording mechanism carried thereby, means for actuating said recording mechanism, and means controlled by said locking means for locking said recording mechanism actuating means against movement.

40. In a machine of the class described, a recording machine, recording mechanism carried thereby, an autographic register, paper feeding mechanism carried thereby, means for locking said feeding mechanism in operative position, and means controlled by said locking means for retracting said recording mechanism to normal position.

41. In a machine of the class described, a recording machine, operating mechanism and recording mechanism carried by said recording machine, an autographic register, feeding mechanism carried thereby, means actuated by said feeding mechanism for operating said recording mechanism, and means controlled by said operating mechanism for locking said feeding mechanism.

42. In a machine of the class described, a recording machine, operating mechanism and recording mechanism carried thereby, an autographic register, feeding mechanism carried thereby, means actuated by said feeding mechanism for operating said recording mechanism, means controlled by said operating mechanism for locking said feeding mechanism, and means for locking said feeding mechanism against movement when said feeding mechanism is out of proper operative position.

43. In a machine of the class described, a recording machine, operating mechanism and recording mechanism carried thereby, an autographic register, paper feeding rollers carried thereby, means under the control of said operating mechanism and operatively connected to one of said feeding rollers for locking said feeding rollers against movement, and means operatively connected to another of said feeding rollers for actuating said recording mechanism.

44. In a machine of the class described, a recording machine, operating mechanism and recording mechanism carried thereby, an autographic register, paper feeding rollers carried thereby, means under the control of said operating mechanism and operatively connected to one of said feeding rollers for locking said rollers against movement, means operatively connected to another of said feeding rollers for actuating said recording mechanism, and means for locking the said actuating means against movement when said feeding rollers are out of operative position.

45. In a machine of the class described, an autographic register, coacting paper feeding members carried thereby, a recording machine, recording mechanism carried thereby, means controlled by said paper feeding members for operating said recording mechanism, and means for locking said members against operative movement when said members are out of coactive engagement with each other.

46. In a machine of the class described, an autographic register, coacting paper feeding members carried thereby, a recording machine, recording mechanism carried thereby, means coacted by said paper feeding members for operating said recording mechanism, means for holding said paper feeding members out of operative engagement with each other, and a plurality of locking means for locking said members in operative engagement with each other.

47. In a machine of the class described, an autographic register, paper feeding members carried thereby, a recording machine, recording mechanism carried thereby, means controlled by said paper feeding members for operating said recording mechanism, resilient means for forcing said paper feeding members out of operative engagement with each other, means for locking said members in operative engagement with each other, and means for preventing the operation of said members when said members are out of operative engagement.

In testimony whereof we affix our signatures.

HENRY M. CROUSE.
GEORGE G. NEWELL.